United States Patent
Duewer

(10) Patent No.: US 7,113,907 B2
(45) Date of Patent: Sep. 26, 2006

(54) CIRCUITS AND METHODS FOR REDUCING PIN COUNT IN MULTIPLE-MODE INTEGRATED CIRCUIT DEVICES

(75) Inventor: Bruce Eliot Duewer, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 510 days.

(21) Appl. No.: 10/463,947

(22) Filed: Jun. 17, 2003

(65) Prior Publication Data

US 2005/0010399 A1    Jan. 13, 2005

(51) Int. Cl.
*H03M 1/00*    (2006.01)

(52) U.S. Cl. .................................... 704/212; 341/122

(58) Field of Classification Search ................ None
See application file for complete search history.

(56) References Cited

U.S. PATENT DOCUMENTS

| | | | | |
|---|---|---|---|---|
| 4,577,343 A | * | 3/1986 | Oura | 704/258 |
| 4,811,128 A | * | 3/1989 | Ono et al. | 360/73.12 |
| 6,696,829 B1 | * | 2/2004 | Nguyen et al. | 324/76.53 |
| 7,049,988 B1 | * | 5/2006 | Duewer et al. | 341/123 |

* cited by examiner

*Primary Examiner*—Susan McFadden
(74) *Attorney, Agent, or Firm*—Thompson & Knight LLP; James J. Murphy

(57) ABSTRACT

A method of controlling a terminal of an integrated circuit includes determining a frequency ratio between a frequency of a signal and a frequency of another signal received by an integrated circuit. A selected signal appearing at a selected terminal of the integrated circuit is selectively interpreted in accordance with an operating mode when the frequency ratio is below a selected value and in accordance with another operating mode when the frequency of the signal is above a selected value.

16 Claims, 3 Drawing Sheets

CIRCUITS AND METHODS FOR REDUCING PIN COUNT IN MULTIPLE-MODE INTEGRATED CIRCUIT DEVICES

FIELD OF INVENTION

The present invention relates in general to integrated circuits and in particular to circuits and methods for reducing pin count in multiple-mode integrated circuit devices.

BACKGROUND OF INVENTION

Reducing the number of pins required by an integrated circuit is normally one important factor in reducing overall packaged integrated circuit device size and cost. Additionally, integrated circuit devices with smaller numbers of pins typically assist in reducing the design complexity at the higher levels of the system application. At the same time, any reduction in the number of pins cannot unduly limit the input/output capability of the integrated circuit nor unreasonably constrain the range of operations available to the end user. This situation is particularly true in regard to integrated circuit devices that support multiple modes, such as digital audio devices which can be utilized in either pulse code modulation (PCM) or Direct Stream Digital (DSD) applications and thereby support different application options in a single package.

A pulse code modulated (PCM) audio system typically utilizes three clocks and a single stream of PCM—encoded serial audio data (SDATA). Specifically, an external master clock (EMCK) signal controls the overall timing of the processing operations, a serial or bit clock (SCLK) signal times the transfer of the individual bits of serial PCM audio data, and a left-right clock (LRCK) signal differentiates between left and right stereo data samples in the PCM data stream. On the other hand, the Direct Stream Digital (DSD) protocol, used to record audio under the Sony/Philips Super Audio Compact Disk (SACD) standard, is based on two channels of one-bit audio data (DSDA and DSDB) and a single serial clock (DSD_CLK) signal. The DSD protocol also utilizes the external master clock EMCK. Therefore, in order to accommodate both modes in a single flexible and efficient integrated circuit device, an input/output scheme must be developed which addresses the differences between the DSD and PCM protocols with a minimum number of pins.

One current approach to providing the required input/output capability in DSD—PCM multiple-mode devices utilizes two independent sets of pins, one set for exchanging DSD protocol data and clock signals, and another set for exchanging PCM data and clock signals. This technique, however, is contrary to the goal of reducing the number of pins on the packaged device and/or overall package size. Another conventional approach is to share some pins for both the DSD and PCM modes, and dedicating other pins for supporting only one mode or the other. For example, one or more of the pins required for exchanging PCM mode clock signals might be also used for exchanging one channel of data in the DSD mode. However, this scheme normally requires additional internal and external control circuitry and/or one or more mode control pins for configuring the data and clock pins to support the selected operating mode.

Consequently, new techniques are required for supporting multiple-mode integrated circuits with a minimum number of pins. In particular, such techniques should not require the dedication of one or more available pins for mode configuration purposes nor require substantial additional control circuitry.

SUMMARY OF INVENTION

The principles of the present invention advantageously provide efficient techniques for minimizing the number of terminals on an integrated circuit. According to one particular embodiment, a method is disclosed for controlling a terminal of an integrated circuit and includes determining a frequency ratio between a selected signal received by the integrated circuit and another selected signal received by the integrated circuit. A selected signal appearing at a selected terminal of the integrated circuit is selectively interpreted in accordance with an operating mode when the frequency ratio is below a selected value and in accordance with another operating mode when the frequency of the signal is above a selected value.

Advantageously, the principles of the present invention allow a signal applied to a selected terminal of an integrated circuit to control the operation of one or more other pins of that integrated circuit. In turn, pins can be shared between different operating modes and the overall number of pins required to fully support the integrated circuit is advantageously reduced.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
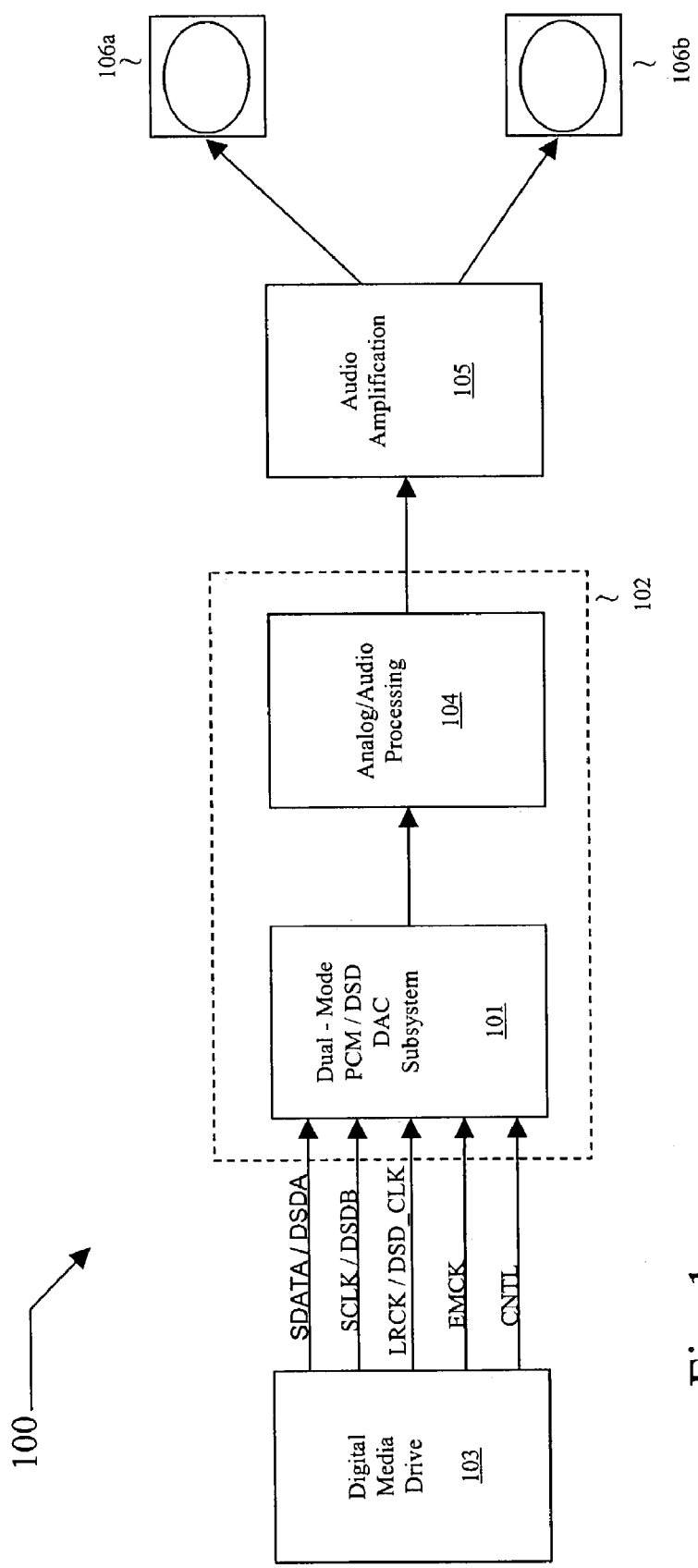
FIG. 1 is a diagram of a representative audio system application of a digital to analog converter (DAC) subsystem according to the principles of the present invention.
Figure 2:
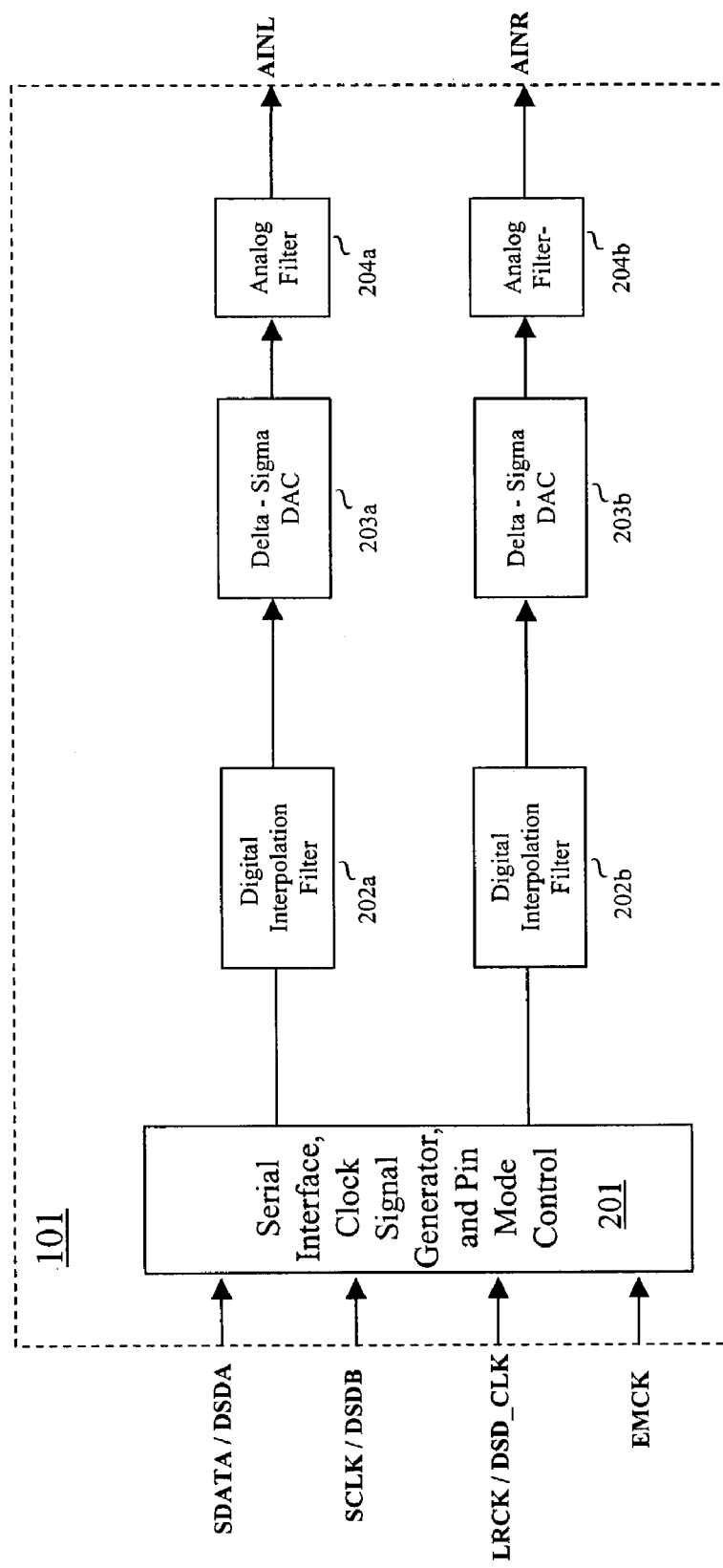
FIG. 2 is a block diagram of an exemplary DAC subsystem embodying the principles of the present invention and suitable for use in the representative system of FIG. 1.
Figure 3:
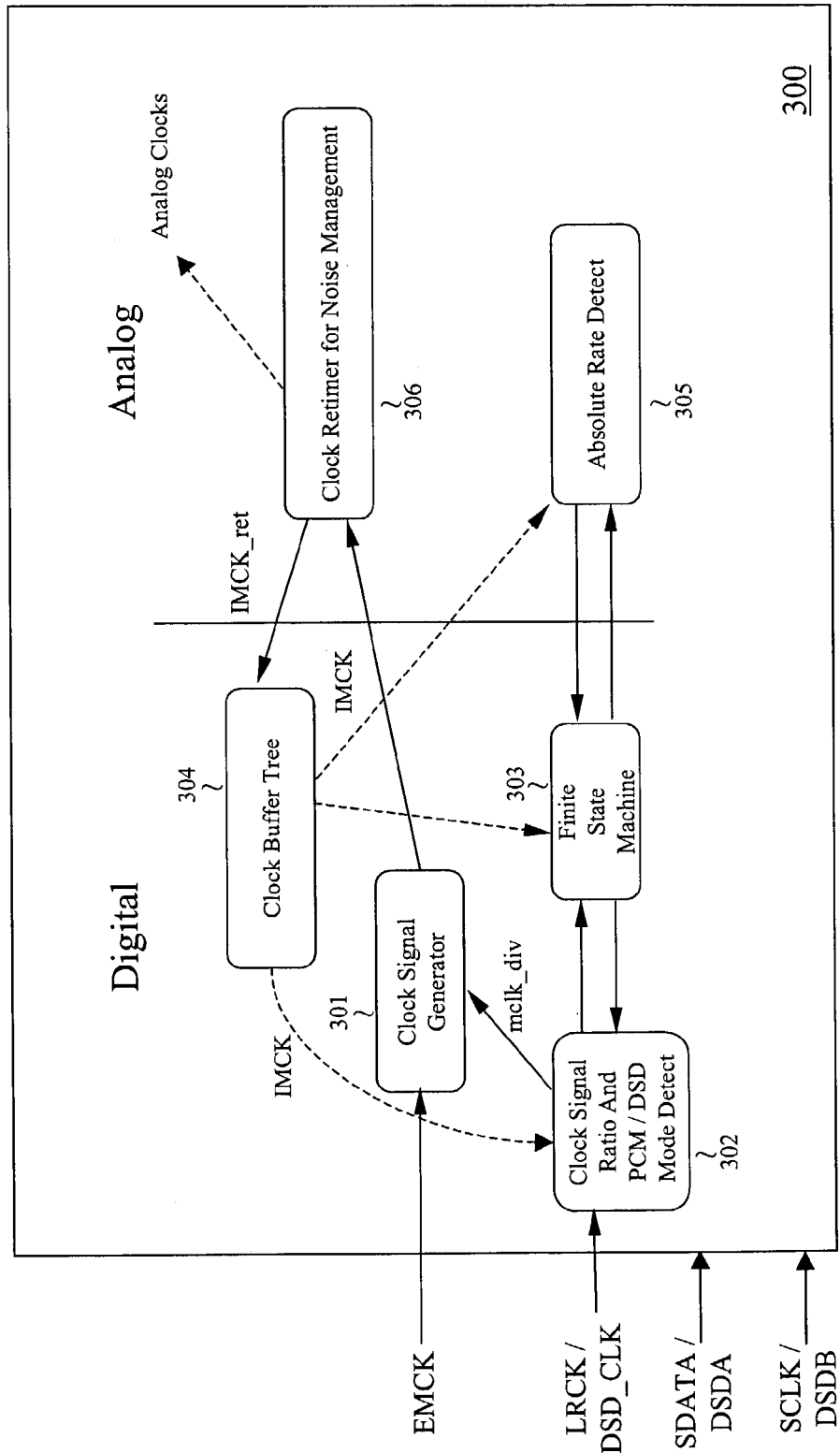
FIG. 3 is a block diagram of clock generation and pin mode control circuitry suitable for use in applications such as the DAC subsystem shown in FIG. 2.

The principles of the present invention and their advantages are best understood by referring to the illustrated embodiment depicted in FIGS. 1–3 of the drawings, in which like numbers designate like parts.

FIG. 1 is a diagram of a representative audio system 100 including a dual-mode pulse code modulation (PCM)—Direct Stream Digital (DSD) digital to analog converter (DAC) 101 subsystem according to the principles of the present invention. In this example, DAC subsystem 101 forms part of an audio component 102, such as a compact disk (CD) player, digital audio tape (DAT) player, or digital versatile disk (DVD) unit. A digital media drive 103 recovers the digital data, for example, one-bit DSD audio from a Sony/Philips Super Audio Compact Disk (SACD), or multiple-bit PCM audio data from a traditional compact disk (CD). In either case, the recovered audio data, along with corresponding clocks and control signals, are passed to DAC subsystem 101, as discussed further below. The resulting analog audio data output from DAC subsystem 101 undergoes further processing in analog/audio processing block 104 prior to amplification in audio amplification block 105. Audio amplification block 105 then drives a set of conventional speakers 106a and 106b.

In the PCM mode, multi-bit PCM—encoded audio data are received from media drive 103 by DAC subsystem 101 serially through an SDATA/DSDA pin timed by a serial clock (SCLK) signal received through the SCLK/DSDB pin. Left and right channel stereo data received through the SDATA/DSDA pin are alternately processed in response to a left-right clock (LRCK) signal, which is normally at the audio sampling rate, received through a corresponding LRCK/DSD_CLK pin. In system 100, an external master clock (EMCK) signal is received by DAC subsystem 101 from digital media drive 103 through an EMCK pin.

In the DSD mode, two-channels of one-bit audio data, DSDA and DSDB, are received by DAC subsystem 101 through the SDATA/DSDA and SCLK/DSDB pins, respectively. The DSD clock signal DSDA_CLK times the transfer of the DSDA and DSDB audio data and is received through the LRCK/DSD_CLK pin in the DSD mode. In alternate embodiments, the signal-pin mapping varies depending on the given integrated circuit design. For example, in one alternate embodiment, the SCLK/DSDB pin receives DSD data DSDA in the DSD mode and the SDATA/DSDA pin receives DSD data DSDB data in the DSD mode.

FIG. 2 is a high-level functional block diagram of a representative embodiment of DAC subsystem 101 shown in FIG. 1. DAC subsystem 101 includes serial interface, clock signal generator, and pin mode control block 201, which provides the interface with media drive 103, also of FIG. 1, through the SDATA/DSDA, SCLK/DSDB, LRCK/DSD_CLK, and EMCK pins. As discussed in further detail below, serial interface, clock generator, and pin mode control block 201 includes detection circuitry which monitors the frequency of the clock signal presented at the LRCK/DSD_CLK pin, determines whether that frequency corresponds to either the frequency of the LRCK clock signal associated with the PCM mode or the frequency of the DSD_CLK clock signal associated with the DSD mode and then directs the signals at the SDATA/DSDA and SCLK/DSDB pins to be accordingly interpreted for PCM or DSD mode operations.

The illustrated embodiment of DAC subsystem 101 shown in FIG. 2 processes two channels of either PCM or DSD audio data, with each audio channel passing through a corresponding digital interpolation filter 202a–202b, delta-sigma DAC 203a–203b, and analog output filter 204a–204b. In the DSD mode, the data path including delta-sigma DAC 203a, and analog output filter 204a, processes the audio data DSDA received through the SDATA/DSDA pin, while the data path including delta-sigma DAC 203b, and analog output filter 204b processes the audio data DSDB received through the SCLK/DSDB pin. In the illustrated embodiment, interpolation filters 202a and 202b are not utilized in DSD mode, as DSD data directly received from the SACD medium from media drive 103 of FIG. 1, are at a sufficiently high sampling rate without interpolation. In other words, in the DSD mode, the audio data are not passed through the interpolator. In the PCM mode, the data path including interpolation filter 202a, delta-sigma DAC 203a, and analog output filter 204a, process left channel audio from the PCM stream received at the SDATA/DSDA pin in response to the LRCK clock signal received at the LRCK/DSD_CLK pin. Similarly, the data path including interpolation filter 202b, delta-sigma DAC 203b, and analog output filter 204b alternately process right channel data in the PCM stream received at the SDATA/DSDA pin in the PCM mode in response to LRCK signal. As stated earlier, DAC subsystem 101 receives the data serially through SDATA/DSDA pin timed by SCLK signal received through the SCLK/DSDB pin.

Generally, digital interpolation filters 202a–202b increase the sample rate of the corresponding data stream, as required in the PCM mode. Delta-sigma DACs 203a and 203b perform noise shaping on the digital data and generate corresponding analog data streams. Analog filters 204a and 204b perform low-pass filtering to remove noise above the audio passband.

FIG. 3 is a block diagram of representative clock signal generation—PCM/DSD mode detection circuitry 300 suitable for use in serial interface, clock generator, and pin mode control block 201 of FIG. 2. Clock generation/detection circuitry 300 includes a clock signal generator 301, which receives an external clock signal, such as the external master clock (EMCK) signal shown in FIG. 1, and generates one or more internal clock signals, such as an internal master clock (IMCK) signal shown in FIG. 3. Generally, clock generator 301 generates the IMCK signal with a predetermined relationship with the EMCK signal under the control of control data MCLK_DIV. In PCM audio applications, the IMCK signal has a frequency at least twice the SCLK signal frequency and has a selected oversampling ratio with respect to the frequency of the LRCK signal, for example 256×, 128× or 64×. Furthermore, the IMCK signal has an absolute frequency range dictated by the operating characteristics of the device-internal circuitry.

Control data MCLK_DIV (internal to mode detection circuitry 300) are generated by clock signal ratio and PCM/DSD detector 302 under the control of finite state machine 303. Generally, while clock generator circuitry 301 cycles through the possible values of the IMCK signal, clock ratio detector 302 compares the externally generated LRCK signal, at the input sample rate, against each current IMCK provided through a clock buffer tree 304. In turn, clock ratio detector 302 steps through values of the MCLK_DIV data until the desired IMCK to LRCK frequency ratio is obtained.

Absolute rate detector 305 monitors the absolute frequency of the IMCK signal and allows finite state machine 303 to maintain the absolute frequency of the IMCK signal within predetermined limits while the IMCK signal is varied to achieve the proper IMCK clock signal to LRCK signal frequency ratio. A clock retimer 306 retimes the IMCK signal as required for internal noise management.

As previously indicated, in the PCM mode, the LRCK/DSD_CLK pin receives the LRCK signal and during the DSD mode, the LRCK/DSD CLK pin receives the DSD_CLK signal. Typically, the frequency of the LCLK signal utilized in PCM audio systems to differentiate between multiple-bit samples of left and right channel data input received through the SDATA pin is smaller than the frequency of the DSD_CLK signal used in DSD audio systems to clock one-bit data samples through the DSDA and DSDB pins. For example, in current PCM audio systems, the frequency of the LCLK signal is at the audio sample rate, which is normally 192 kHz or less. For an associated MCLK signal having a frequency of 12.288 MHz, the LRCK signal frequency to MCLK signal frequency ratio for a 192 kHz clock signal is sixty-four (64). In contrast, in an SACD system operating on DSD data, the DSD_CLK signal frequency is typically 2.8 MHz. Therefore, in the DSD mode, the MCLK signal frequency to DSD_CLK clock signal frequency ratio is much smaller, in this case 12.288 MHz to 2.8 MHz, or approximately four (4) to one (1).

According to the principles of the present invention, clock signal ratio and PCM/DSD mode detect block 302 counts the number of periods of the EMCK signal received at the EMCK pin per period of the current signal presented at the LRCK/DSD_CLK pin. If the number of the periods of the MCLK signal per signal period detected at the LRCK/DSD_CLK pin is small, such as thirty-two (32) or less, then the signal received at the LRCK/DSD_CLK pin is treated as the DSD_CLK clock signal and DAC subsystem 101 of FIG. 1 operates in the DSD mode. In this case, the signals received at the SDATA/DSDA and SCLK/DSDB pins are accordingly treated as the DSDA and DSDB data signals, respectively. On the other hand, if the number of MCLK signal periods per period of the signal received at the LRCK/DSD_CLK pin is greater than thirty-two (32), then the clock signal received at the LRCK/DSD_CLK pin is treated as the LRCK clock signal, the signal received at the SDATA/DSDA pin is treated as PCM SDATA data, and the signal received at the SCLK/DSDB pin is treated as the PCM SCLK clock signal. In this case, DAC subsystem 101 operates in the PCM mode.

In additional embodiments, detection of the current mode and the corresponding interpretation of the pin inputs is performed by observing the relationship between signals other than those received at the LRCK/DSD_CLK and EMCK pins. For example, in one particular alternate embodiment, the signals appearing at the SCLK/DSDB and LRCK/DSD_CLK pins are compared in frequency, and from the resulting frequency ratio, a determination is made as to whether the integrated circuit is in the PCM or DSD mode currently.

In sum, application of the principles of the present invention advantageously allow for a multiple-mode integrated circuit to be supported by a reduced or minimized number of pins. In turn, the overall device size becomes smaller, less expensive, and easier to utilize at the system level. In particular, these principles provide an efficient way of detecting the current operating mode by observing the characteristics of corresponding input signals received at selected input/output pins. Depending on the characteristics of the detected input signals, the integrated circuit enters the proper operating mode and the signals received at all of the corresponding pins are appropriately treated according to that mode.

While a particular embodiment of the invention has been shown and described, changes and modifications may be made therein without departing from the invention in its broader aspects, and, therefore, the aim in the appended claims is to cover all such changes and modifications as fall within the true spirit and scope of the invention.

What is claimed is:

1. A method of controlling a terminal of an integrated circuit to reduce terminal count of an integrated circuit: comprising:
    receiving at corresponding terminals of an integrated circuit a signal and another signal from a source device;
    determining a frequency ratio between a frequency of the signal and a frequency of the other signal received by the integrated circuit;
    selectively interpreting a selected signal appearing at a selected multiple-purpose input terminal of the integrated circuit in accordance with an operating mode when the frequency ratio is below a selected value and in accordance with another operating mode when the frequency ratio is above a selected value; and
    operating on the selected signal in response to the corresponding one of the operating mode and another operating mode to generate an output signal for controlling a destination device, and thereby allow the terminal count of the integrated circuit to be reduced.

2. The method of claim 1, wherein the selected signal comprises a selected one of the signal and the other signal.

3. The method of claim 1, wherein determining the frequency ratio comprises counting a number of periods of the signal relative to a period of the another signal.

4. The method of claim 1, wherein the selected signal is interpreted as a clock signal in the operating mode and is interpreted as data in the another operating mode.

5. The method of claim 1, wherein the operating mode is a direct stream digital audio operating mode and the another operating mode is a pulse code modulated audio operating mode.

6. The method of claim 5, wherein the selected signal is interpreted as an audio left-right clock in the pulse code modulated operating mode and as a direct stream digital clock in the direct stream digital audio operating mode.

7. The method of claim 5, wherein the selected signal is interpreted as a channel of direct stream digital audio data in the direct stream digital audio operating mode.

8. The method of claim 1, wherein the selected signal is interpreted as a first clock in the first operating mode and is interpreted as a second clock in the another operating mode.

9. An integrated circuit comprising:
    ratio detection circuitry for determining a ratio between a frequency of a signal and a frequency of another signal received by an integrated circuit; and
    at least one multiple-purpose input terminal for receiving a selected signal in a first operating mode when the ratio is below a selected value and another selected signal in a second operating mode when the ratio is above the selected value, the multiple-purpose input terminal reducing a terminal count on the integrated circuit.

10. The integrated circuit of claim 9, wherein the selected signal comprises a selected one of the signal and the another signal.

11. The integrated circuit of claim 9, wherein the ratio detection circuitry is operable to count a number of periods of the signal relative to a period of the another signal.

12. The integrated circuit of claim 9, wherein the selected signal comprises a clock signal in the first operating mode and comprises data in the another operating mode.

13. The integrated circuit of claim 9, wherein the selected signal comprises a first clock signal in the operating mode and comprises a second clock signal in the another operating mode.

14. The integrated circuit of claim 9, wherein the selected signal comprises a direct stream digital audio signal in the operating mode and a pulse code modulated audio signal in the another operating mode.

15. The integrated circuit of claim 9, wherein the selected signal comprises an audio left-right clock in the operating mode and a direct stream digital clock in the another operating mode.

16. The integrated circuit of claim 9, wherein the selected signal comprises a channel of direct stream digital audio data in the operating mode.

* * * * *